United States Patent
Ciora, Jr. et al.

(10) Patent No.: US 8,425,656 B2
(45) Date of Patent: Apr. 23, 2013

(54) TRANSPORT MEMBRANE CONDENSER USING TURBULENCE PROMOTERS

(75) Inventors: Richard J. Ciora, Jr., Butler, PA (US); Paul K T Liu, Lafayette Hill, PA (US); Eric Cheponis, Pittsburgh, PA (US)

(73) Assignee: Media and Process Technology, Inc., Pittsburgh, PA (US)

( * ) Notice: Subject to any disclaimer, the term of this patent is extended or adjusted under 35 U.S.C. 154(b) by 269 days.

(21) Appl. No.: 13/013,417

(22) Filed: Jan. 25, 2011

(65) Prior Publication Data

US 2012/0186791 A1    Jul. 26, 2012

(51) Int. Cl.
*B01D 53/22*     (2006.01)
(52) U.S. Cl.
USPC ................. 95/45; 95/43; 95/52; 96/4; 96/8; 96/10
(58) Field of Classification Search ............... 95/43, 45, 95/52; 96/4, 8, 10
See application file for complete search history.

(56) References Cited

U.S. PATENT DOCUMENTS

| | | | |
|---|---|---|---|
| 2,948,668 A * | 8/1960 | De Whalley et al. | 204/636 |
| 3,734,135 A | 5/1973 | Mosier | |
| 4,823,865 A | 4/1989 | Hughes | |
| 5,013,447 A * | 5/1991 | Lee et al. | 210/640 |
| 5,053,060 A * | 10/1991 | Kopf-Sill et al. | 95/46 |
| 5,054,252 A * | 10/1991 | Newman | 52/169.14 |
| 5,061,376 A * | 10/1991 | MacGregor | 204/554 |
| 5,139,529 A * | 8/1992 | Seita et al. | 29/469.5 |
| 5,279,647 A * | 1/1994 | Gatten et al. | 96/6 |
| 5,309,987 A | 5/1994 | Carlson | |
| 5,497,824 A | 3/1996 | Rouf | |
| 6,864,005 B2 * | 3/2005 | Mossman | 429/414 |
| 2007/0256448 A1 | 11/2007 | Kim et al. | |
| 2009/0261034 A1 * | 10/2009 | Takahashi et al. | 210/500.23 |

* cited by examiner

*Primary Examiner* — Jason M Greene
*Assistant Examiner* — Anthony Shumate

(57) ABSTRACT

An apparatus and method for enhancing the heat and water recovery from a transport membrane condenser (TMC) includes a non-moving mechanical device inserted into the TMC tubes to increase the heat transfer efficiency via the enhancement of the fluid turbulence and/or surface area. The apparatus and methods may be applied to porous tubes arranged in a spaced array, similar to a conventional shell and tube heat exchanger device. Other configurations of the TMC may be conceived and adapted for use with the described apparatus and method.

15 Claims, 3 Drawing Sheets

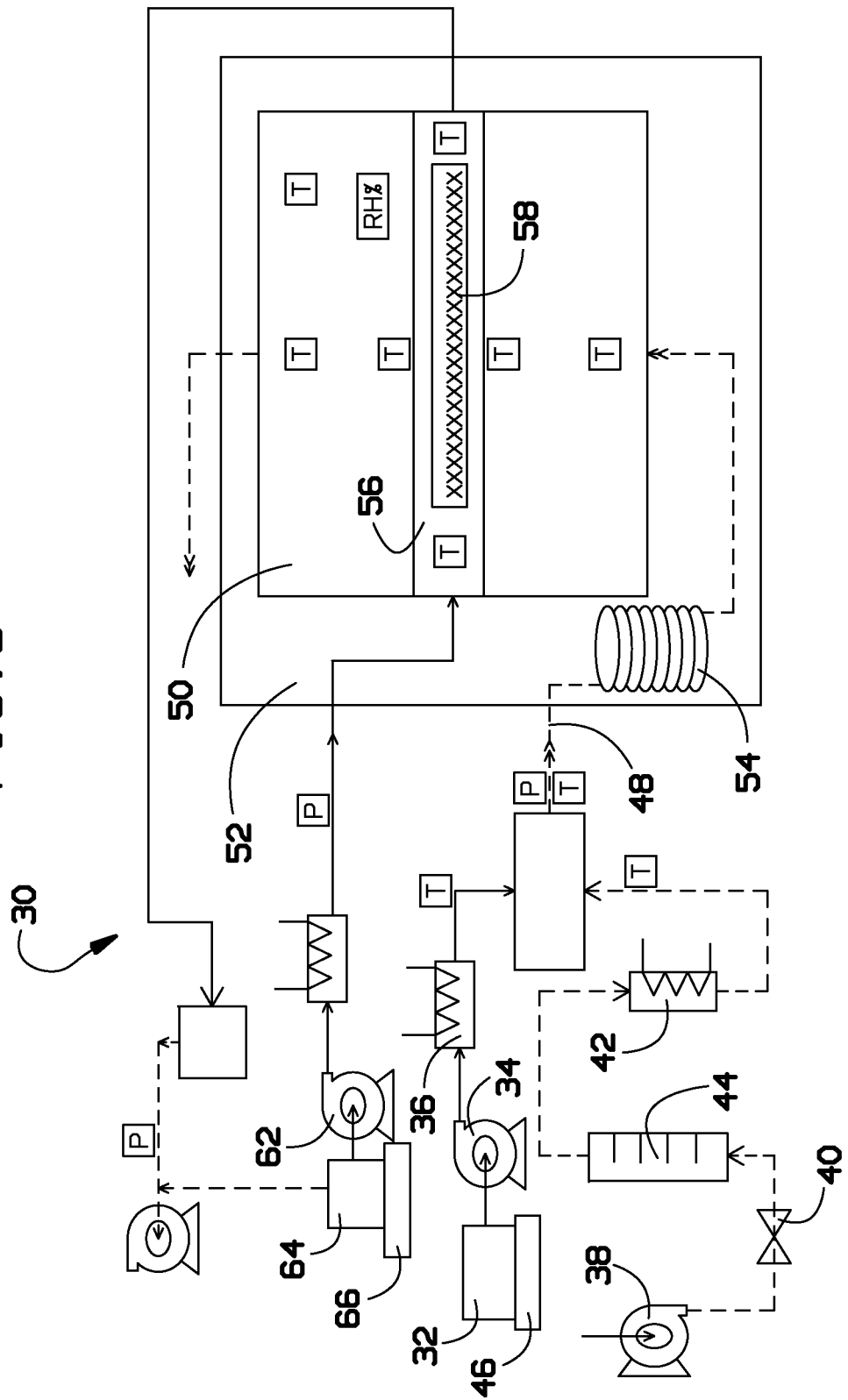

TRANSPORT MEMBRANE CONDENSER USING TURBULENCE PROMOTERS

BACKGROUND OF THE INVENTION

The present invention relates to transport membrane condensers and, more particularly, to a transport membrane condenser containing a turbulence promoter disposed inside the transport membrane condenser tubes for enhancing the heat and liquid recovery thereof.

Many industrial processes produce process streams containing condensable components, such as water vapor and volatile organics. Typically, it is desirable to remove and recover these condensable components from the process streams for environmental and/or economic reasons. In addition, it is also desirable to recover the latent heat of vaporization associated with such condensable components as a means for reducing the process energy requirements. The use of heat exchanger-based condensers for the recovery of condensable components of process streams and the latent heat of vaporization associated therewith is well known to those skilled in the art.

As can be seen, there is a need to enhance the heat and liquid recovery of a transport membrane condenser.

SUMMARY OF THE INVENTION

In one aspect of the present invention, a transport membrane condenser comprises one or more porous tubes adapted to containing a flowing fluid therewithin; at least one turbulence promoter disposed inside the tubes, wherein the transport membrane condenser is adapted to condense vapors from a gas stream flowing across the one or more porous tubes and recover at least a portion of the condensate into the flowing liquid.

In another aspect of the present invention, a method for improving the heat and condensate recovery efficiency of a transport membrane condenser comprises flowing a cooling fluid through one or more porous tubes; passing the cooling fluid through at least one turbulence promoter disposed inside the tubes; and condensing vapors from a gas stream flowing across the one or more porous tubes and recovering at least a portion of the condensate into the flowing liquid.

These and other features, aspects and advantages of the present invention will become better understood with reference to the following drawings, description and claims.

BRIEF DESCRIPTION OF THE DRAWINGS

FIG. 3 is a schematic diagram of a transport membrane condenser bench testing unit;

DETAILED DESCRIPTION OF THE INVENTION

Figure 1:
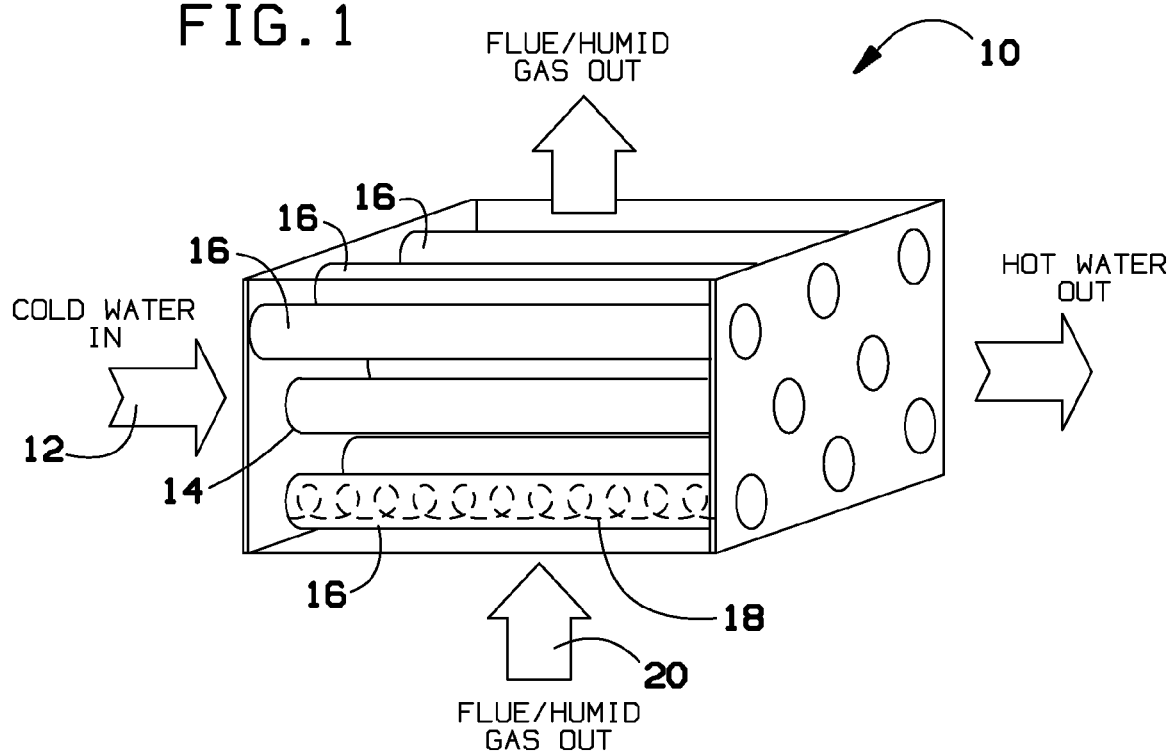
FIG. 1 is a perspective view of a transport membrane condenser adaptable for use with the turbulence promoters of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides apparatus and methods for enhancing the heat and water recovery from a transport membrane condenser (TMC). A non-moving mechanical device may be inserted into the TMC tubes to increase the heat transfer efficiency via the enhancement of the fluid turbulence and/or surface area. The apparatus and methods of the present invention may be applied to porous tubes arranged in a spaced array, similar to a conventional shell and tube heat exchanger device. Other configurations of the TMC may be conceived and adapted for use with the apparatus and methods of the present invention.

A typical TMC may be used for the condensation and recovery of water vapor from water vapor laden gas streams of combustion flue gases, drying operation off-gases or other condensable vapor laden streams. The TMC is essentially a porous heat exchanger. In its simplest form, the TMC is a shell and tube gas to liquid heat exchanger with gas on the outside of the tubes and liquid on the inside. The heat contained in the vapor can be recovered, along with the recovery of vapor condensate, through the porous heat exchanger tubes. Thus, the TMC may be able to recover the latent heat and the condensate simultaneously, with a single device, directly into the cooling fluid. The TMC is described, for example, in U.S. Pat. No. 6,517,607, the disclosure of which is herein incorporated by reference.

In a conventional gas/liquid heat exchanger, the heat transfer efficiency is generally limited by the high heat transfer resistance on the gas side of the device. A contemporary example of this contention is the automobile radiator. The high temperature liquid circulating through the engine is cooled by the atmospheric air blowing across the external surface of the radiator. Because the air side heat transfer efficiency is low, numerous fins are attached to the air side of the radiator to increase the surface area. No such measures are included on the tube (liquid) side of the radiator. Therefore, in the automobile radiator application, the heat transfer efficiency is limited by the gas side resistance to heat transfer, so fins are installed to enhance the efficiency. Unexpectedly, the liquid side heat transfer resistance is relatively high in the TMC device and can be greater than that of the gas side. The high liquid side heat transfer resistance can be attributed to low turbulence inside the tube. In a conventional heat exchanger, the liquid flow can be increased to improve turbulence and therefore heat transfer efficiency. However, this is not generally possible in TMC applications. For TMC applications, it is desirable that the condensate recovered be kept at as high temperature as possible. Thus, it is desirable to keep the liquid flow rate as low as possible, although low liquid flow rates yield low heat transfer coefficients and hence low heat transfer.

Use of turbulence promoters to improve heat transfer has been discussed in several prior arts. As examples, in U.S. Pat. No. 3,734,135, a turbulence promoter was used inside a tube to enhance heat transfer. In US 20070256448A1, a turbulence promoter was included in the refrigerant side of a heat exchanger for improving heat transfer. Various configurations of turbulence promoters were also presented. In U.S. Pat. No. 4,823,865, another turbulence promoter was presented for a heat exchanger. In U.S. Pat. No. 5,497,824, an improved version of a turbulence promoter was claimed in a tube to improve the heat transfer, while, in U.S. Pat. No. 5,309,987, a turbulence promoter was included in the shell side of a heat exchanger. In spite of these prior arts on the use of turbulence promoters to enhance heat transfer, none of these prior arts have suggested the use of a turbulence promoter for improving heat transfer for the transport membrane condenser (TMC).

By using the turbulence promoters in transport membrane condensers, as described in greater detail below, the heat transfer may rise due to an increase in the fluid turbulence on the tube (liquid) side of the TMC. The turbulence promoter may also act as a surface area extender if the device's thermal conductivity is greater than the fluid's thermal conductivity. In both instances, the heat transfer efficiency in the tube side of the TMC may be increased. In general, as shown in FIG. 1, a heat exchanger 10 (also referred to as TMC 10) may receive liquid 12 at one end 14 of TMC tubes 16. The liquid 12 inside the tubes 16 may be intercepted by and may come into contact with one or more turbulence promoters 18 (see FIGS. 2A through 2C) disposed inside the tubes 16. The turbulence promoters 18 may improve the heat transfer to the fluid continuously by promoting convective flow of fluid to and from the inside surface of the tube and/or by increasing the inside tube surface area for heat exchange. Flue or other gas 20 may pass on the shell side of the tubes, as shown in FIG. 1.

The turbulence promoters 18 may be any solid packing or fixture that can be inserted into the TMC tubes 16. The turbulence promoters 18 may improve the water turbulence and/or extend the surface area of the inside of the TMC tubes 16. Various device configurations can be envisioned, including rods, rings, tubes, spheres, plates, and the like. The turbulence promoters 18 (also referred to as heat transfer enhancing devices) can be constructed of any material suitable for application in the expected TMC fluid environment. Potential materials can include, but are not limited to, metals (copper and steel, for example) and plastics (polypropylene, Teflon®, polyvinylidene fluoride, for example).

The turbulence promoters 18 may be inserted into the TMC tubes 16 and configured to permit the flow of fluid through the tube 16 while (i) substantially disrupting the flow pattern in the tube 16 so as to produce turbulent flow in the liquid side of the TMC; and (ii) increasing the surface area of the TMC inside the tube 16. The turbulence promoters 18 may be sized so that periodic contact is made between the turbulence promoters 18 and the inside surface of the TMC tube 16. However, this does not preclude devices which can be envisioned that have little or no contact with the inside wall of the TMC tube 16. The number of contacts, frequency of contact, and configuration of the contact between the turbulence promoters 18 and the inside surface of the TMC tube 16 may determine the heat transfer efficiency. The geometry of the turbulence promoters 18 can be highly random or highly ordered. For convenience of insertion and removal of the turbulence promoters 18 from the TMC tubes 16, the turbulence promoters 18 may consist of a single continuous part although a discontinuous turbulence promoter 18 may be acceptable. An example of a continuous device may include a static mixer, while a model for a discontinuous device may include randomly packed spheres.

Figure 2A:
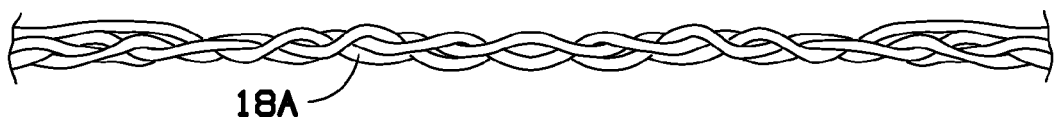
FIG. 2A is a braided wire example of a turbulence promoter according to an exemplary embodiment of the present invention.
Figure 2B:
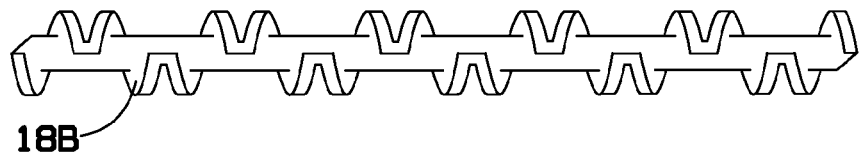
FIG. 2B is a plastic mixer example of a turbulence promoter according to an exemplary embodiment of the present invention.
Figure 2C:
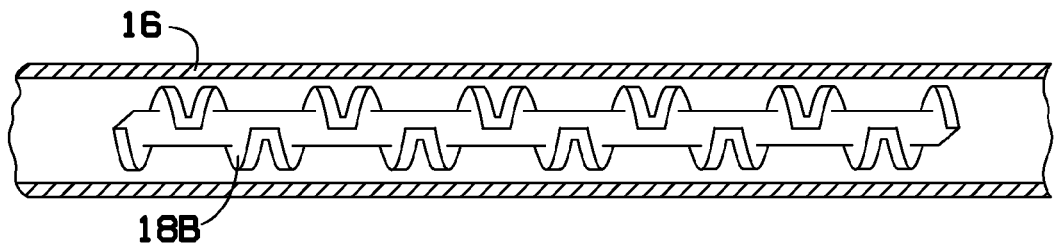
FIG. 2C is a cross-sectional view of the plastic mixer of FIG. 2B inserted into a transport membrane condenser tube according to the present invention.

Referring to FIGS. 2A through 2C, there are shown various exemplary embodiments of the turbulence promoters 18. In FIG. 2A, a turbulence promoter 18a may be formed from braided wires, such as braided copper wires. In FIG. 2B, a turbulence promoter 18b may be formed of a plastic mixer. FIG. 2C shows the plastic mixer turbulence promoter 18b inserted into the TMC tube 16.

Referring to FIG. 3, a laboratory TMC setup 30 is depicted. Humidified air may be prepared by vaporizing the appropriate quantity of water from reservoir 32 via a pump 34, through a vaporizer 36 and then introducing the humidified air into a preheated air stream from compressor 38, metering valve 40 and preheater 42. The air flow rate may be monitored with a rotameter 44 and the water flow rate may be monitored by weighing using a scale 46. A resulting humidified air stream 48 may be fed to a TMC chamber 50 which is maintained at constant temperature in an oven 52. The temperature of the humidified air stream 48 may be equilibrated with the oven temperature in a coil 54. A membrane element 56 as a TMC may be fitted into the TMC chamber 50 normal to the gas flow. A turbulence promoter 58 (indicated with a plurality of "x" characters) may be included inside a TMC tube 56. Cold water may be fed to the tube side of the membrane element 56. The cold water flow rate may be controlled by a pump 62 from a sealed reservoir 64. The cold water flow rate may be monitored via weight measurement with a scale 66.

Figure 4:
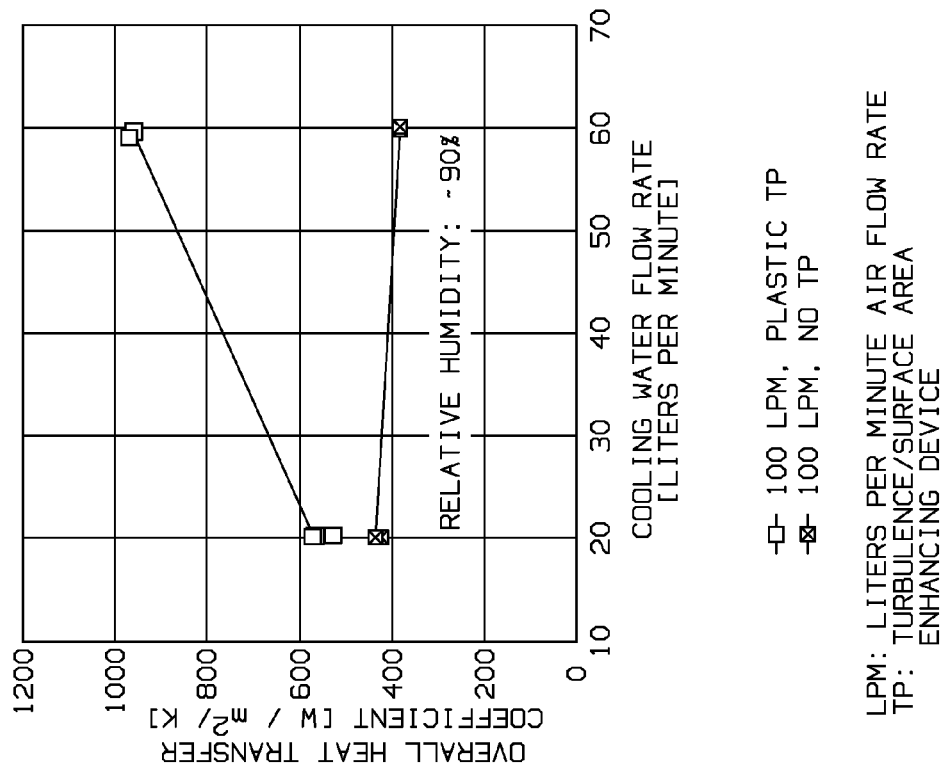
FIG. 4 is a graph showing the overall heat transfer coefficients as a function of cooling water flow rates with and without the turbulence promoter installed in a transport membrane condenser tube.

Relative humidities of about 60% and 90% and humidified air flow rates of 20 and 100 standard liters per minute (SLPM) (corresponding to air side linear velocities at the tube of 0.4 and 2.1 ft/sec) were used during testing. Cooling water flow rates of 20 and 60 cc per minute and cooling water inlet temperatures of 30 to 35° C. were used. Cooling water pressure was maintained at 3 to 5 psig vacuum. Throughout the TMC testing the operating conditions of relative humidity, air flow rates, and the cooling water flow rates were altered and the exit cooling water temperature was measured as detailed in Table 1. FIG. 4 shows the results for overall heat transfer coefficient, $U_o$, plotted as a function of cooling water flow rate and air flow rate at RH of 60%, respectively. The overall heat transfer coefficient, $U_o$, was determined using the following formula:

$$U_o = mC_p(T_{out}-T_{in})/\{[(T_{air}-T_{in})+(T_{air}-T_{out})]/2\}/A$$

where m is the mass flow rate of cooling water, $C_p$ is the heat capacity of the fluid (water), $T_{in}$ and $T_{out}$ are the inlet and outlet cooling water temperatures of the TMC tube, respectively, $T_{air}$ is the air temperature, and A is the surface area of the TMC tube. In this formula, the average temperature difference across the TMC tube versus the log mean temperature difference was used for simplicity. Under the examined test conditions, the difference in the calculated $U_o$ between using the average and log mean temperature difference is <3% and does not change the overall trends in the reported results.

Example 1

In this example a TMC tube commercially available from Media and Process Technology Inc. was used. The dimensions of the tube were 10" length×3.5 mm ID×5.7 mm OD. A membrane layer coated the outside surface of the tube and had a nominal pore size of 500 Å and a nominal thickness of 20 μm. No turbulence promoting/surface area extending device was installed in the tube, so that baseline performance data of the tube in the TMC laboratory apparatus could be determined. Air flow rates of 20 and 100 standard liters per minute (SLPM) (corresponding to air side velocities at the tube of 0.4 and 2.1 feet per second, respectively) were used at air temperature of ca. 70 to 76° C. Throughout the TMC testing the operating conditions of relative humidity, air flow rates, and the cooling water flow rates were altered and the exit cooling water temperature was measured as detailed in Table 1. FIG. 4 shows the results for $U_o$ plotted as a function of cooling water flow rate at an RH of 60%. For this test no turbulence promoting/surface area extending device was used. Cases I, II, and III in Table 1 show water temperature rise of approximately 18-21° C. for a cooling water flow of 20 cc/min and approximately 6-7° C. at 60 cc/min with no turbulence promoting/surface area extending device installed. The overall heat transfer coefficients were calculated to be about 220-250 W/m²/K at 20 cc/min and ca. 175-210 W/m²/K at 60 cc/min of cooling water flow rate.

cooling water flow rate and air flow rate at an RH of 60%. Cases IV and V of Table 1 summarize the results and the testing conditions. The overall heat transfer coefficients of 300-335 and 360-460 W/m²/K were obtained for the cooling water flow rates of 20 and 60 cc/min, respectively. Temperature rise of 21-23° C. and 11-14° C. were obtained for cooling water flow rates of 20 and 60 cc/min, respectively. Obviously, the use of the turbulence promoting/surface area extending device significantly enhanced the cooling water temperature rise and the overall heat transfer coefficient.

Example 3

In this example, a turbulence promoting/surface area extending device was constructed from a commercial device used for 2-part epoxy mixing. The Sulzer STATOMIX MA 4.0-17-S series static mixer was obtained from Brandywine

TABLE 1

| Test Summary | Case # | Overall Heat Transfer Coefficient $U_0$ (W/m²/K) | Relative Humidity (%) | Cooling Water flow (cc/min) | Air Temperature (° C.) Below Tube | Air Temperature (° C.) Above Tube | Cooling Water Temperature (° C.) Inlet | Cooling Water Temperature (° C.) Outlet | Air Flow (slpm) | Air Velocity (ft/sec) | Cooling Water Temperature (° C.) |
|---|---|---|---|---|---|---|---|---|---|---|---|
| No TP | I | 226 | 57.7 | 20.6 | 69.8 | 71.1 | 36.0 | 53.9 | 20 | 0.4 | 17.9 |
| | | 175 | 59.0 | 63.9 | 70.3 | 70.3 | 34.5 | 40.3 | 20 | 0.4 | 5.8 |
| | | 235 | 59.3 | 20.9 | 75.7 | 71.3 | 36.6 | 54.6 | 100 | 2.1 | 18.0 |
| | | 208 | 60.5 | 59.5 | 75.5 | 71.2 | 35.6 | 42.6 | 100 | 2.1 | 7.0 |
| No TP | II | 227 | 58.2 | 20.4 | 75.0 | 70.2 | 35.8 | 53.4 | 20 | 0.4 | 17.7 |
| | | 252 | 62.4 | 20.5 | 76.2 | 72.3 | 34.6 | 55.5 | 20 | 0.4 | 20.9 |
| | | 184 | 59.9 | 59.5 | 75.8 | 71.2 | 34.4 | 40.8 | 20 | 0.4 | 6.4 |
| No TP | III | 223 | 57.5 | 20.2 | 71.3 | 70.7 | 33.8 | 52.5 | 100 | 2.1 | 18.7 |
| | | 183 | 62.2 | 60.0 | 72.2 | 71.1 | 35.2 | 41.4 | 100 | 2.1 | 6.2 |
| Copper TP | IV | 335 | 65.4 | 20.3 | 71.3 | 70.0 | 35.8 | 59.0 | 100 | 2.1 | 23.2 |
| | | 322 | 63.6 | 20.4 | 71.6 | 70.1 | 37.9 | 59.1 | 100 | 2.1 | 21.1 |
| | | 464 | 62.0 | 59.6 | 72.0 | 69.6 | 34.8 | 48.3 | 100 | 2.1 | 13.5 |
| | | 460 | 62.0 | 59.6 | 72.1 | 69.8 | 35.0 | 48.5 | 100 | 2.1 | 13.4 |
| Copper TP | V | 304 | 60.3 | 25.3 | 72.9 | 71.0 | 33.5 | 56.1 | 20 | 0.4 | 22.6 |
| | | 359 | 58.2 | 58.1 | 71.5 | 68.2 | 34.1 | 45.1 | 20 | 0.4 | 11.0 |
| Plastic TP | VI | 329 | 59.9 | 21.4 | 79.0 | 73.1 | 33.8 | 59.1 | 20 | 0.4 | 25.3 |
| | | 389 | 61.9 | 59.0 | 77.4 | 69.5 | 34.1 | 46.0 | 20 | 0.4 | 12.0 |
| Plastic TP | VII | 322 | 57.0 | 20.3 | 75.5 | 69.2 | 34.4 | 57.3 | 100 | 2.1 | 22.9 |
| | | 345 | 61.5 | 20.2 | 75.7 | 69.8 | 33.5 | 58.6 | 100 | 2.1 | 25.0 |
| | | 471 | 58.5 | 60.6 | 74.1 | 68.4 | 33.7 | 47.1 | 100 | 2.1 | 13.4 |
| | | 499 | 63.9 | 60.1 | 72.7 | 67.0 | 34.2 | 47.6 | 100 | 2.1 | 13.4 |
| Plastic TP (Increased RH) | VIII | 523 | 89.9 | 20.2 | 80.8 | 81.1 | 37.0 | 76.3 | 100 | 2.1 | 39.3 |
| | | 561 | 92.5 | 20.2 | 80.3 | 80.0 | 33.0 | 76.5 | 100 | 2.1 | 43.5 |
| | | 567 | 91.2 | 20.1 | 80.7 | 79.9 | 35.4 | 76.8 | 100 | 2.1 | 41.4 |
| | | 958 | 92.6 | 59.6 | 80.4 | 79.6 | 35.9 | 64.9 | 100 | 2.1 | 29.1 |
| | | 968 | 91.6 | 59.0 | 80.6 | 79.0 | 36.3 | 65.1 | 100 | 2.1 | 28.8 |
| No TP (Increased RH) | IX | 418 | 89.8 | 20.0 | 78.1 | 76.6 | 35.7 | 67.9 | 100 | 2.1 | 32.1 |
| | | 430 | 90.6 | 20.0 | 77.6 | 76.2 | 34.3 | 67.8 | 100 | 2.1 | 33.5 |
| | | 376 | 90.5 | 59.7 | 77.8 | 76.2 | 33.8 | 47.5 | 100 | 2.1 | 13.6 |
| | | 376 | 91.0 | 59.9 | 78.1 | 76.4 | 35.5 | 48.8 | 100 | 2.1 | 13.4 |

Example 2

In this example, a turbulence promoter/surface area extending device was prepared in-house by braiding together four strands of 18 gauge copper wire. The maximum OD of the helix was approximately 3.5 mm and matched the ID of the tubular ceramic transport membrane condenser. The device was inserted into a 10" length×3.5 mm ID×5.7 mm OD TMC tube, commercially available from Media and Process Technology Inc., as described in Example 1. This TMC tube was then installed in the laboratory scale TMC apparatus (as described above with reference to FIG. 3) to determine the heat transfer efficiency. The tests were conducted similarly to those described in Example 1. FIG. 4 shows the results for the overall heat transfer coefficient (Uo) plotted as a function of Associates. The mixing elements were 4 mm in diameter and 3.21 in length and contained 17 individual mixing elements. The static mixer was constructed of polypropylene. To fit the MA 4.0-17-S mixer into the TMC tube, it was necessary to reduce the OD to 3.5 mm via buffing with sandpaper. Three of the devices were inserted into a 10" length×3.5 mm ID×5.7 mm OD TMC tube, commercially available from Media and Process Technology Inc. described in Example 1. This TMC tube was then installed into the laboratory scale TMC apparatus to determine the heat transfer efficiency. The tests were conducted similarly to those described in Example 1. Case VI & VII of Table 1 present the results at the various operating conditions. Cooling water temperature rises of 23-25 and 12-13° C. and overall heat transfer coefficients of 320-345 and 390-500 W/m²/K were obtained for cooling water flow rates of ~20 and 60 cc/min, respectively.

Example 4

In this example, a turbulence promoting/surface area extending device was constructed from a commercial device used for 2-part epoxy mixing and inserted into a 10" length× 3.5 mm ID×5.7 mm OD TMC tube, commercially available from Media and Process Technology Inc. described in Example 3. This TMC tube was then installed into the laboratory scale TMC apparatus to determine the heat transfer efficiency. The tests were conducted similarly to those described in Example 1. However, in this Example, air was fed to the TMC at a higher relative humidity of approximately 90%. Case VIII of Table 1 presents the results at the various operating conditions. Cooling water temperature rises of 39-43 and 28-29° C. and overall heat transfer coefficients of 523-567 and 958-968 W/m²/K were obtained for cooling water flow rates of ~20 and 60 cc/min, respectively.

Example 5

Figure 5:
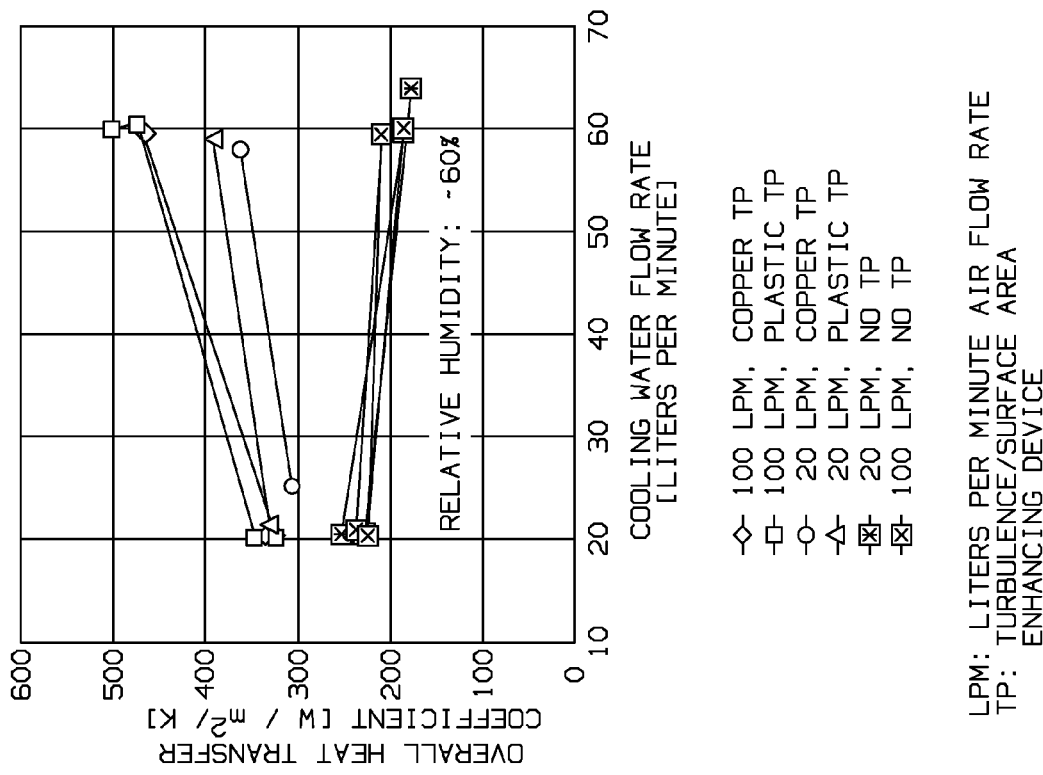
FIG. 5 is another graph showing the overall heat transfer coefficients as a function of cooling water flow rates with and without the turbulence promoter installed in a transport membrane condenser tube.

As a comparison to the Example 4 cases, TMC tube testing was also conducted at a higher air side relative humidity level (~90%) but with no turbulence promoter (No TP) and the results are shown in Case IX in Table 1. As can be seen, the temperature rises of 32-33 and 13° C. and overall heat transfer coefficients of 418-430 and 376 W/m²/K were obtained for cooling water flow rates of ~20 and 60 cc/min, respectively. These values are considerably less than those obtained with the turbulence promoter in place as described in Example 4 and shown in FIG. 5 and again demonstrate the favorable impact of the turbulence promoter.

For the above examples, along with the heat transfer exhibited by the observed temperature increase in the exit, the water vapor condensed on the surface of the porous condenser is recovered through the permeation through the porous membrane due to the lower pressure of the cooling water in the tube side as a result of the vacuum or other means. Therefore, the enhanced heat transfer that resulted from the use of the turbulence promoter described in this invention can enhance the water vapor recovery and/or the water temperature as shown in the above examples.

The present invention can be used for heat and water recovery from streams containing condensable vapors. The above examples involve the heat and water recovery from streams containing water vapor, such as flue gas from boiler flue. However, the invention is not limited to water vapor containing streams, the invention can be used equally effectively for streams containing other condensable vapors, such as industrial drying streams which can contain water vapor, industrial calcining streams which contain chemical vapors released from the calcinations of solids, industrial quenching streams which contain water and chemical vapors generated from the quenching of the metal or other solids, and the like.

It should be understood, of course, that the foregoing relates to exemplary embodiments of the invention and that modifications may be made without departing from the spirit and scope of the invention as set forth in the following claims.

We claim:

1. A transport membrane condenser comprising:
   one or more porous tubes adapted to containing a flowing fluid therewithin;
   at least one turbulence promoter disposed inside at least one of the one or more porous tubes, wherein
   the transport membrane condenser is adapted to condense vapors from a gas stream flowing across the one or more porous tubes and recover at least a portion of the condensate into the flowing liquid.

2. The transport membrane condenser of claim 1, wherein the turbulence promoter is adapted to increase fluid turbulence of the flowing fluid.

3. The transport membrane condenser of claim 2, wherein the turbulence promoter is adapted to extend a surface area of the one or more porous tubes having the turbulence promoter therewithin.

4. The transport membrane condenser of claim 1, wherein the turbulence promoter is a solid fixture.

5. The transport membrane condenser of claim 4, wherein the turbulence promoter includes a braided metallic wire.

6. The transport membrane condenser of claim 4, wherein the turbulence promoter is a static mixer.

7. The transport membrane condenser of claim 6, wherein the static mixer is a plastic mixer.

8. The transport membrane condenser of claim 1, wherein the turbulence promoter contacts at least a portion of the inside of the porous tube.

9. The transport membrane condenser of claim 1, wherein the one or more porous tubes includes a plurality of porous tubes, each one of the porous tubes having a turbulence promoter therewithin.

10. A method for improving the heat and condensate recovery efficiency of a transport membrane condenser, the method comprising:
    flowing a cooling fluid through one or more porous tubes;
    passing the cooling fluid through at least one turbulence promoter disposed inside the tubes; and
    condensing vapors from a gas stream flowing across the one or more porous tubes and recovering at least a portion of the condensate into the flowing liquid.

11. The method of claim 10, further comprising contacting at least a portion of an inside of the porous tube with the turbulence promoter disposed therewithin.

12. The method of claim 10, further comprising increasing the turbulence of the cooling fluid.

13. The method of claim 10, further comprising extending a surface area of the one or more porous tubes having the turbulence promoter therewithin.

14. The method of claim 10, wherein the turbulence promoter includes a braided metallic wire.

15. The method of claim 10, wherein the turbulence promoter is a plastic static mixer.

* * * * *